(12) United States Patent
Shao et al.

(10) Patent No.: US 11,886,175 B2
(45) Date of Patent: Jan. 30, 2024

(54) SYSTEMS OF INDUSTRIAL INTERNET OF THINGS (IOT) FOR AUTOMATED GUIDED VEHICLE (AGV) CONTROL, METHODS, AND MEDIA THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Xiaojun Wei, Chengdu (CN); Yongzeng Liang, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 18/172,277

(22) Filed: Feb. 21, 2023

(65) Prior Publication Data
US 2023/0205191 A1    Jun. 29, 2023

(30) Foreign Application Priority Data
Aug. 17, 2022  (CN) .......................... 202210984519.2

(51) Int. Cl.
*G05B 19/418*  (2006.01)
(52) U.S. Cl.
CPC ... *G05B 19/41895* (2013.01); *G05B 19/4183* (2013.01)
(58) Field of Classification Search
CPC .................. G05B 19/41895; G05B 19/4183
See application file for complete search history.

(56) References Cited

U.S. PATENT DOCUMENTS

| 2020/0293063 A1* | 9/2020 | Aisu ..................... G01C 21/343 |
| 2021/0103286 A1* | 4/2021 | Wang .................... G05D 1/0221 |
| 2023/0152820 A1* | 5/2023 | Huang ................. G05D 1/0217 701/26 |

FOREIGN PATENT DOCUMENTS

| CN | 102830705 A | 12/2012 |
| CN | 107179759 A | 9/2017 |

(Continued)

OTHER PUBLICATIONS

Wu, NaiQi, and MengChu Zhou. "Shortest routing of bidirectional automated guided vehicles avoiding deadlock and blocking." IEEE/ASME transactions on mechatronics 12.1 (2007): 63-72. (Year: 2007).*

(Continued)

*Primary Examiner* — Christopher E. Everett
(74) *Attorney, Agent, or Firm* — METIS IP LLC

(57) ABSTRACT

The present disclosure provides a system of an industrial Internet of Things (IoT) for an automated guided vehicle (AGV) control, a method, and a medium. The method includes: obtaining an AGV circuit layout and forming an AGV operation model; obtaining a feeding time, each AGV being fed for at least once within a preset period; the material end point being a node for receiving material in the AGV operation model; calculating an operation track of each AGV of the AGV operation model within the preset period based on the operation speed and the feeding time; adjusting the operation speed to recalculate the operation tracks until the operation process is qualified; and sending the operation track of the qualified operation process to a user platform through the service platform to display to a user.

8 Claims, 7 Drawing Sheets

(56) References Cited

FOREIGN PATENT DOCUMENTS

| | | |
|---|---|---|
| CN | 107272698 A | 10/2017 |
| CN | 109165830 A | 1/2019 |
| CN | 110264120 A | 9/2019 |
| CN | 111099293 A | 5/2020 |
| CN | 111115139 A | 5/2020 |
| CN | 111413980 A | 7/2020 |
| CN | 111932000 A | 11/2020 |
| CN | 112734324 A | 4/2021 |
| CN | 112887347 A | 6/2021 |
| CN | 113074728 A | 7/2021 |
| CN | 114137825 A | 3/2022 |
| CN | 114281048 A | 4/2022 |
| CN | 114777779 A | 7/2022 |

OTHER PUBLICATIONS

Lyu, Xiangfei, et al. "Approach to integrated scheduling problems considering optimal number of automated guided vehicles and conflict-free routing in flexible manufacturing systems." IEEE Access 7 (2019): 74909-74924. (Year: 2019).*

Liu, D. K., et al. "Motion coordination of multiple autonomous vehicles in dynamic and strictly constrained environments." 2006 IEEE Conference on Cybernetics and Intelligent Systems. IEEE, 2006. (Year: 2006).*

Kulatunga, A. K., et al. "Ant colony optimization based simultaneous task allocation and path planning of autonomous vehicles." 2006 IEEE Conference on Cybernetics and Intelligent Systems. IEEE, 2006. (Year: 2006).*

Decision to Grant a Patent in Chinese Application No. 202210984519.2 dated Oct. 26, 2022, 8 pages.

First Office Action in Chinese Application No. 202210984519.2 dated Sep. 26, 2022, 21 pages.

Ye, Hanglu, Research on Intelligent Manufacturing Logistics Platform in Industrial Internet Environment, Chinese Master's Theses Full-text Database, 2022, 82 pages.

Wang, Jia et al., Intelligent AGV Transport Cart Based on ROS, Scientific and Technological Innovation, 2020, 3 pages.

* cited by examiner

700

---
Predicting, based on the candidate operation speed combination, the arrival time of each AGV arriving at the node through a prediction model — 710

Determining, based on the arrival time and a material demand urgency, a sorting result of the candidate operation speed combinations — 720

FIG. 7

SYSTEMS OF INDUSTRIAL INTERNET OF THINGS (IOT) FOR AUTOMATED GUIDED VEHICLE (AGV) CONTROL, METHODS, AND MEDIA THEREOF

CROSS-REFERENCE TO RELATED APPLICATION

This application claims priority of Chinese Patent Application No. 202210984519.2, filed on Aug. 17, 2022, the contents of which are entirely incorporated herein by reference.

TECHNICAL FIELD

The present disclosure relates to an intelligent manufacturing technology, and specifically relates to a system of an Industrial Internet of Things (IoT), a method and a medium for an automated guided vehicle (AGV) control.

BACKGROUND

An automated guided vehicle (AGV) refers to a transport vehicle equipped with an automatic navigation device such as an electromagnetic or optical automatic navigation device, which can travel along a prescribed navigation path, and has safety protection and various transfer functions. In an industrial application, the transport vehicle with no driver may use a rechargeable battery as its power source. Usually, a travel path and action of the AGV may be controlled by a computer, or set by an electromagnetic track. The electromagnetic track may be stuck on the floor, and the transport vehicle with no driver relies on information brought by the electromagnetic track to move and act.

With the development of industrial Internet of Things (IoT) technology, an ultra-large-scale production line has become a reality, but the ultra-large-scale production line also means that an AVG material transportation planning is more difficult, and a congestion caused by a high-frequency material transportation is often difficult to alleviate.

SUMMARY

To at least overcome the above deficiency in the present technique, the purpose of the present disclosure is to provide a system of an industrial Internet of Things (IoT), a method and a medium for an automated guided vehicle (AGV) control.

In the first aspect, the embodiments of the present disclosure provide a system of an industrial IoT for the AGV control, including a service platform, a management platform, and a sensor network platform connected in sequence, and the management platform includes: a modeling module configured to obtain an AGV circuit layout of a target workshop through the sensor network platform, and add pre-planned paths of all AGVs to the AGV circuit layout to form an AGV operation model; an obtaining module configured to obtain a feeding time of each material end point within a preset period, each AGV being fed for at least once within the preset period, and the material end point being a node for receiving material in the AGV operation model; a calculation module configured to assign an operation speed to each AGV in the AGV operation model, and calculate, based on the operation speed and the feeding time, an operation track of each AGV of the AGV operation model within the preset period; a determination module configured to determine that a current operation process is unqualified when any two of operation tracks reach a same node at a same time, and adjust the operation speed to recalculate the operation track until the operation process is qualified; and a control module configured to control an operation of an AGV according to the operation track of a qualified operation process, and send the operation track of the qualified operation process to a user platform through the service platform to display to a user.

When the embodiments of the present disclosure are implemented, they are implemented based on a five-platform structure. In the structure, the user platform is a terminal that displays information to a user and receives the user's instructions, and an object platform includes an AGV circuit and an AGV terminal.

In the embodiment of the present disclosure, the service platform may adopt a front sub platform arrangement. The service platform may include a service general platform and at least two service sub-platforms, and different service sub-platforms may be used to receive different types of data transmitted by the management platform. The sensor network platform may adopt a centralized arrangement, that is, data received by the sensor network platform may be processed and sent uniformly. The management platform may adopt an independent arrangement, which may include a plurality of management sub-platforms with different calculation functions. Exemplarily, the modeling module, the obtaining module, the calculation module, the determination module, and the control module may all be implemented on a same management sub-platform, and other management sub-platforms may implement other calculation functions.

When the embodiments of the present disclosure are implemented, the pre-planned path of an AGV may be a route that each AGV needs to travel during a material transportation process. In the embodiments of the present disclosure, each AGV may travel in one path or a plurality of paths. A planning process of these paths may be performed by using an ant colony algorithm in the present technique, or may be calculated in other ways. Through the AGV circuit layout and pre-planned paths of all the AGVs, the AGV operation model for subsequent calculations may be formed.

In the embodiment of the present disclosure, to accurately avoid a node congestion, it is necessary to obtain various feeding times within a preset period, and obtaining approach may be obtaining the feeding time according to a process ingredient list. The preset period may generally be a cycle period of feeding, which may generally be calculated according to a feeding interval of each material. Exemplarily, the preset period may preferably be a least common multiple of the feeding intervals of all materials. In the embodiments of the present disclosure, to calculate a position of the AGV at each moment on the path, it is necessary to assign an operation speed to each AGV in the AGV operation model, and calculate the positions of the AGV at different times through the operation speed and the feeding time as an operation track. The assigned operation speed may adopt a value lower than the AGV material transportation standard speed value, usually, 30% to 50% of the standard speed may be preferred to reserve a space for subsequent iterations. On the basis of obtaining the operation track, it may be determined whether any two operation tracks reach the same node at the same time. In response to the determination that there are two operation tracks reach the same node at the same time, the operation speed may be adjusted and the operation track may be recalculated. Since the AGV operation model has been built, a calculation amount of calculating the operation track is very small, so the embodiment of the present disclosure may adopt a mechanism of repeated trial and error to determine the operation track. In the embodiment of the present disclosure, by adjusting the operation speed of the AGV, the operation track of the AGV may be calculated when there is no congestion, and an operation control of the AGV may be performed according to the operation track, in this way, a congestion of feeding AGVs in an ultra-large-scale production line can be effectively avoided, and the feeding efficiency can be improved.

In the second aspect, the embodiments of the present disclosure provide a method of an industrial IoT for an AGV control, the method is applied to a service platform, a management platform and a sensor network platform connected in sequence, and the method is executed by the management platform.

The method includes: obtaining an AGV circuit layout of a target workshop through the sensor network platform, and adding pre-planned paths of all AGVs to the AGV circuit layout to form an AGV operation model; obtaining a feeding time of each material end point within a preset period, each AGV being fed for at least once within the preset period, and the material end point being a node for receiving material in the AGV operation model; assigning an operation speed to each AGV in the AGV operation model, and calculating, based on the operation speed and the feeding time, an operation track of each AGV of the AGV operation model within the preset period; determining that a current operation process is unqualified when any two of operation tracks reach a same node at a same time, and adjusting the operation speed to recalculate the operation track until the operation process is qualified; and controlling an operation of an AGV according to the operation track of a qualified operation process, and sending the operation track of the qualified operation process to a user platform through the service platform to display to a user.

The embodiments of the present disclosure provide a non-transitory computer-readable storage medium storing computer instructions, when the computer instructions are executed by a processor, a computer implements the method of the IoT for an AGV control.

Compared with the present technique, the present disclosure has the following advantages and beneficial effects.

In the system of industrial IoT, method and medium for the AGV control of the present disclosure, by adjusting the operation speed of the AGV, the operation track of the AGV may be calculated when there is no congestion, and an operation control of the AGV may be performed according to the operation track, thereby effectively avoiding a congestion of feeding AGVs in an ultra-large-scale production line, and improving the feeding efficiency.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments, the same numbers refer to the same structures. In the drawings:

FIG. 7 is a flowchart illustrating an exemplary process for determining a sorting result of the candidate operation speed combinations according to some embodiments of the present disclosure.

DETAILED DESCRIPTION

Figure 1:
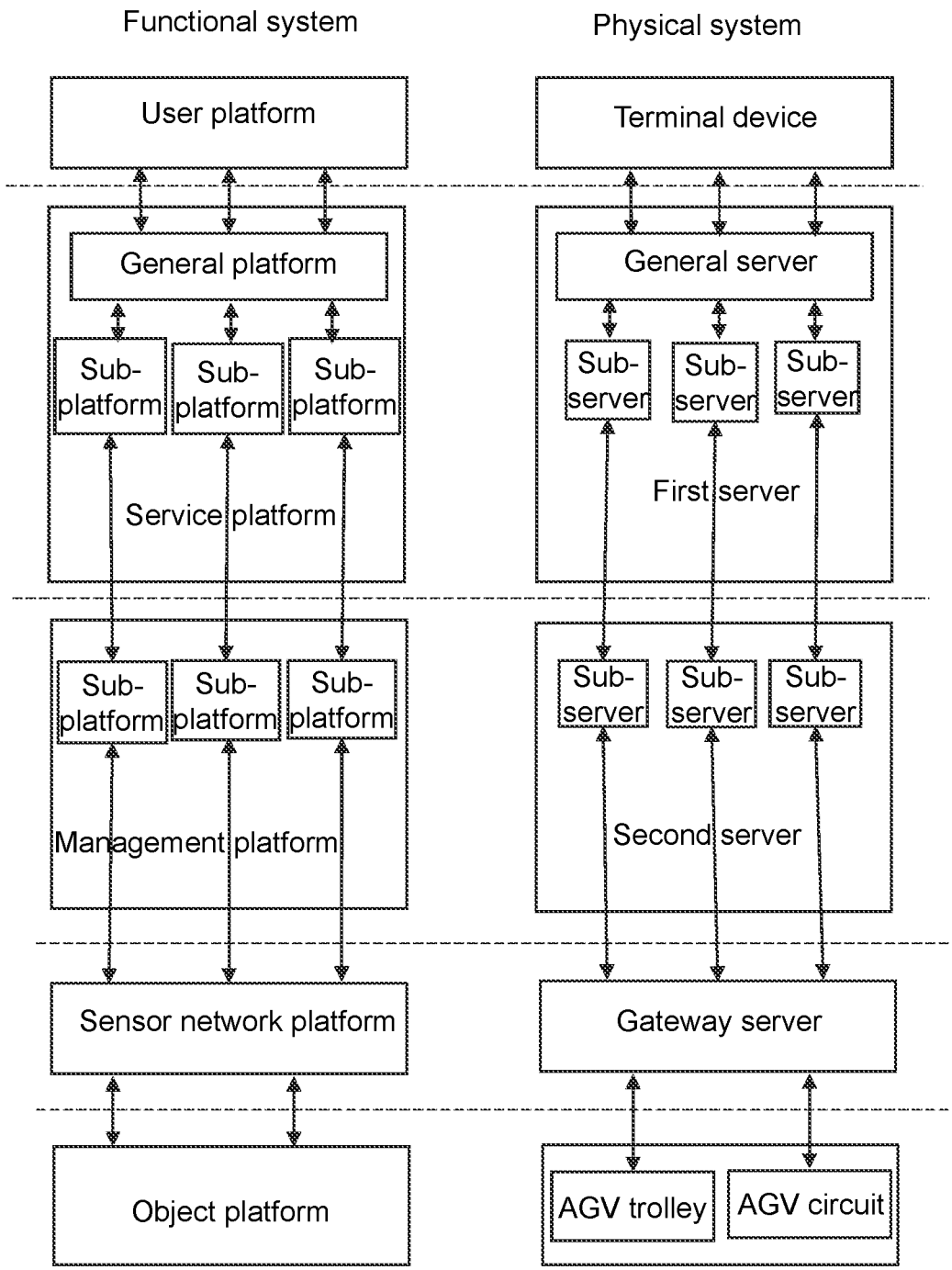
FIG. 1 is a structural diagram illustrating a system of the industrial Internet of Things (IoT) for an automated guided vehicle (AGV) control according to some embodiments of the present disclosure.

In order to more clearly illustrate the purpose, the technical solutions, and the merits of the present disclosure, a clear and integrated description of the technical solutions of the embodiments of the present disclosure may be given as follows combined with the drawings. It should be understood that, the drawings described below are only some examples or embodiments of the present disclosure, and cannot limit the protection scope of the present disclosure. In addition, it should be understood that the schematic drawings are not drawn to real scale. The flowcharts are used in the present disclosure illustrating operations implemented according to some embodiments of the present disclosure. It should be understood that the operations of the flowcharts may be performed out of order and that operations without logical context may be performed in reverse order or concurrently. In addition, those skilled in the art may add one or more other operations to the flowchart, and may further remove one or more operations from the flowchart under the guidance of the contents of the present disclosure.

In addition, the described embodiments are only a part of the embodiments of the present disclosure, not all of the embodiments. The components of the embodiments of the present disclosure described and illustrated in the drawings herein may usually be arranged and designed in a variety of different configurations. Thus, the following detailed descriptions of the embodiments of the present disclosure provided with the drawings are not intended to limit the scope of the present disclosure as claimed, but are merely some of the selected embodiments of the present disclosure. Based on the embodiments of the present disclosure, all other embodiments obtained by those skilled in the art without creative efforts shall fall within the protection scope of the present disclosure.

FIG. 1 is a structural diagram illustrating a system of the industrial Internet of Things (IoT) for an automated guided vehicle (AGV) control according to some embodiments of the present disclosure.

To facilitate the description of the above-mentioned system of the industrial IoT for the AGV control, please refer to FIG. 1, which provides a schematic diagram illustrating a communication architecture of the system of the Industrial IoT for the AGV control disclosed in the embodiments of the present disclosure. The system of the industrial IoT may include a user platform, a service platform, a management platform, a sensor network platform, and an object platform that are connected in sequence. The management platform may include: a modeling module configured to obtain to obtain an AGV circuit layout of a target workshop through the sensor network platform, and add pre-planned paths of all AGVs to the AGV circuit layout to form an AGV operation model; an obtaining module configured to obtain a feeding time of each material end point within a preset period, and each AGV being fed for at least once within the preset period, and the material end point is a node for receiving material in the AGV operation model; a calculation module configured to assign an operation speed to each AGV in the AGV operation model, and calculate, based on the operation speed and the feeding time, an operation track of each AGV of the AGV operation model within the preset period; a determination module configured to determine that a current operation process is unqualified when any two of operation tracks reach a same node at a same time, and adjust the operation speed to recalculate the operation tracks until the operation process is qualified; and a control module configured to control an operation of an AGV according to the operation track of a qualified operation process, and send the operation track of the qualified operation process to a user platform through the service platform to be displayed to a user.

When the embodiments of the present disclosure are implemented, they may be implemented based on a five-platform structure. The user platform may be a terminal that displays information to a user and receives a user instruction, and the object platform may include an AGV circuit and an AGV terminal (such as an AGV trolley, etc.)

In the embodiment of the present disclosure, the service platform may adopt a front sub platform arrangement. The service platform may include a service general platform and at least two service sub-platforms, and different service sub-platforms may be used to receive different types of data transmitted by the management platform. The sensor network platform may adopt a centralized arrangement, that is, data received by the sensor network platform may be processed and sent uniformly. The management platform may adopt an independent arrangement, which may include a plurality of management sub-platforms with different calculation functions. Exemplarily, the modeling module, the obtaining module, the calculation module, the determination module, and the control module may all be implemented on a same management sub-platform, and other management sub-platforms may implement other calculation functions, and the embodiments of the present disclosure do not limit on this. The service sub-platforms may respectively receive data such as the operation track of the qualified operation process, the AGV circuit layout, and the AGV operation model.

Specifically, the management sub-platform used to perform the calculations in the embodiments of the present disclosure may obtain the AGV circuit layout through the sensor network platform and complete relevant calculations, and then send the AGV circuit layout, the operation track of the qualified operation process, and the AGV operation model to different corresponding service sub-platforms, and the service general platform may aggregate the data received by each service sub-platform, such as the AGV circuit layout, the operation track of the qualified operation process, and the AGV operation model, and send the data to the user platform to display to the user.

The target workshop may refer to a workshop that needs to transport materials through the AGV. For example, the target workshop may be an assembly workshop, a production workshop, a packaging workshop, etc. The assembly workshop may be an automobile assembly workshop, etc.

The AGV circuit layout may refer to an overall layout of a transportation circuit of the AGV. The AGV may refer to a transport vehicle equipped with an automatic navigation device such as an electromagnetic or optical automatic navigation device, which can travel along a prescribed navigation path, and has safety protection and various transfer functions. The AGV may further be called as the AGV trolley. For example, the AGV circuit layout may be a layout including each AGV transportation circuit in a certain workshop.

The pre-planned paths of all the AGVs may include paths needed by material transportation of each AGV.

The AGV operation model may refer to a model in which all AGVs operate according to a pre-planned path in the AGV circuit layout.

In some embodiments, the modeling module may obtain the AGV circuit layout of the target workshop through an interface. The interface may include but not limited to a program interface, a data interface, a transmission interface, etc. For example, the modeling module may automatically obtain the AGV circuit layout of the target workshop from an interface.

In some embodiments, the modeling module may obtain the AGV circuit layout of the target workshop through the sensor network platform. For example, the modeling module may automatically obtain the AGV circuit layout of the target workshop through the sensor network platform.

In some embodiments, the modeling module may further obtain the AGV circuit layout of the target workshop in any approach well known to those skilled in the art.

In some embodiments, the modeling module may determine the pre-planned paths of all the AGVs through various algorithms. The various algorithms may include a genetic algorithm, a particle swarm algorithm, an ant colony algorithm, etc. The modeling module may add the determined pre-planned paths of all the AGVs to the AGV circuit layout to form an AGV operation model.

When the embodiments of the present disclosure are implemented, the pre-planned path of an AGV may be a route that each AGV needs to travel during a material transportation process. In the embodiments of the present disclosure, each AGV may travel in one path or a plurality of paths. A planning process of these paths may be performed by using an ant colony algorithm in the present technique, or may be calculated in other ways. Through the AGV circuit layout and pre-planned paths of all the AGVs, the AGV operation model for subsequent calculations may be formed.

In the embodiment of the present disclosure, to accurately avoid a node congestion, it is necessary to obtain various feeding times within a preset period.

In some embodiments, each AGV may be fed at least once within the preset period.

A material end point may refer to a node in the AGV operation model that receives the material, for example, a dashboard assembly station in an automobile assembly workshop where a certain type of dashboard is needed to be transported to. In some embodiments, a material end point attributes may include a material demand. The material demand may refer to information related to the demand of a certain material at the material end point, such as a quantity demand and a time demand of a certain material.

The feeding time may refer to a time when each material end point needs the material within the preset period. For example, the feeding time is 18:00.

In some embodiments, the obtaining module may obtain the feeding time of each material end point within the preset period through an interface. The interface may include but not limited to a program interface, a data interface, a transmission interface, etc. For example, the obtaining module may automatically obtain the feeding time from a certain interface.

In some embodiments, the obtaining module may obtain the feeding time through the sensor network platform.

In some embodiments, the obtaining module may further obtain the feeding time in any approach well known to those skilled in the art.

An obtaining approach may be obtaining the feeding time according to a process ingredient list. The preset period may generally be a cycle period of feeding, which may generally be calculated according to a feeding interval of each material. Exemplarily, the preset period may preferably be a least common multiple of the feeding intervals of all materials.

In the embodiments of the present disclosure, to calculate a position of the AGV on the path at each time, it is necessary to assign an operation speed to each AGV in the AGV operation model, and calculate the positions of the AGV at different times through the operation speed and the feeding time as an operation track.

The operation speed may refer to a speed of each AGV for transporting materials. For example, the speed of an AGV trolley is 1 m/s. The operation speed of each AGV may be the same or different.

The operation track may refer to a travel path of each AGV transporting materials. Different AGVs may correspond to different operation tracks. The operation track may be indicated by a coordinate of each AGV on the path and a corresponding time. For more contents of the operation track, please refer to the related descriptions of FIG. 3. In some embodiments, the operation track may include arrival times corresponding to each AGV arriving at different nodes. For more contents about the arrival time, please refer to the related descriptions of FIG. 6.

In some embodiments, the calculation module may assign an operation speed to each AGV in the AGV operation model in a variety of ways. For example, the calculation module may randomly assign an operation speed to each AGV. For another example, the calculation module may assign an operation speed to each AGV based on an AGV material transportation standard speed value.

The assigned operation speed may adopt a value lower than the AGV material transportation standard speed value, usually, 30% to 50% of the standard speed may be preferred to reserve a space for subsequent iterations.

In some embodiments, the calculation module may obtain pre-planned paths of all AGVs through the AGV operation model. The calculation module may calculate the coordinate of each AGV on the path and the corresponding time, etc., as the operation track according to a pre-planned path of each AGV, the feeding time of the material end point corresponding to the pre-planned path of each AGV, the operation speed of each AGV, etc.

In some embodiments, the calculation module may predict the arrival time of each AGV arriving at the node through a prediction model based on the pre-planned paths, the operation speeds, and the feeding times of all AGVs. For more contents of the prediction model, please refer to FIG. 6 and the related descriptions.

The node of the AGV operation model may include a start point of the material (the node that provides the material), the end point of the material (the node that receives the material), an intersection of the AGV circuit, etc. The node that provides the material may refer to a location in the target shop where the material may be stored, for example, the location in the automobile assembly workshop where the materials such as engine cases, instrument panels, and gearboxes of different types may be stored.

The intersection of the AGV circuit may refer to a connection point where the AGV circuits intersects in the target workshop, for example, the point where an AGV circuit 1 for transporting an engine case and an AGV circuit 2 for transporting a dash board intersect in the automobile assembly workshop, etc. The AGV circuit layout may include a plurality of intersections of the AGV circuits.

In some embodiments, when any two operation tracks reach the same node at the same time, the determination module may determine that the current operation process is unqualified. For example, if the operation track of AGV trolley A and the operation track of AGV trolley B reach node C at the same time, the current operation process may be unqualified, and the operation speed may need to be adjusted to recalculate the operation tracks.

In some embodiments, when any two operation tracks reach the same node at the same time, the determination module may adjust the operation speed of the AGV corresponding to one of the any two operation tracks, thereby changing the operation track corresponding to the AGV.

In some embodiments, the determination module may obtain the operation track of each AGV in a plurality of historical preset periods. A plurality of initial operation speed combinations may be determined based on the operation track of each AGV. A target operation speed combination may be determined through a preset algorithm based on the plurality of initial operation speed combinations. The target operation speed combination may include an adjusted operation speed corresponding to each AGV. The determination module may recalculate the operation track based on the adjusted operation speed. For more contents on determining the target operation speed combination through the AGV operation track, please refer to FIG. 3 and its related descriptions.

On the basis of obtaining the operation track, it may be determined whether any two operation tracks reach the same node at the same time. In response to the determination that there are two operation tracks reach the same node at the same time, the operation speed may be adjusted and the operation track may be recalculated. Since the AGV operation model has been built, a calculation amount of calculating the operation track is very small, so the embodiment of the present disclosure may adopt a mechanism of repeated trial and error to determine the operation track.

In some embodiments, when any operation track does not reach the same node at the same time with another operation track, it may be regarded as an operation track of a qualified operation process.

In some embodiments, the control module may control the operation of the AGV according to the operation track of the qualified operation process.

In some embodiments, the control module may send the operation track of the qualified operation process to the user platform to display to the user through the service platform.

In the embodiment of the present disclosure, by adjusting the operation speed of the AGV, the operation track of the AGV may be calculated when there is no congestion, and an operation control of the AGV may be performed according to the operation track, in this way, a congestion of feeding AGVs in an ultra-large-scale production line can be effectively avoided, and the feeding efficiency can be improved.

In a possible embodiment, the calculation module may be further configured to perform the following steps.

A loading time of each material start point in the AGV operation model within the preset period may be calculated through the operation speed and the feeding time, and the material start point may be a node that provides material in the AGV operation model.

A path between the material start point and the corresponding material end point may be obtained in the AGV operation model, and a coordinate of the AGV on the path and a corresponding time may be calculated as the operation track based on the feeding time, the operation speed, and the loading time.

When the embodiments of the present disclosure are implemented, in order to facilitate the calculation of the operation track, the feeding times corresponding to different feeding positions may be obtained first, and then the coordinates of the AGV on the path and the times corresponding to the coordinates may be calculated through the feeding times, thereby forming the operation track.

In some embodiments, the calculation module may predict, based on the pre-planned paths, the operation speeds, and the feeding times of all AGVs, the loading time of each material start point and an arrival time of each AGV arriving at the node in the AGV operation model within the preset period through a prediction model, and the prediction model is a machine learning model. More details about the prediction model may be found in FIG. 6 and related descriptions thereof.

In a possible implementation approach, the determination module may be further configured to: obtain a number of key nodes that all the pre-planned paths pass through in the AGV operation model, the key nodes being intersections of AGV circuits in the AGV operation model; process the number of the key nodes as an adjustment weight and assign the adjustment weight to the path; and when adjusting the operation speed, adjust the operation speed corresponding to the path according to the adjustment weight.

In a possible implementation approach, the adjustment weight may be an inverse of the number of the key nodes; the determination module may be further configured to: when adjusting the operation speed, select preset basic increase data of the operation speed; calculate a product of the adjustment weight and the basic increase data as a corrected speed; and superpose the corrected speed to the corresponding operation speed and complete the adjustment of the operation speed.

When the embodiments of the present disclosure are implemented, to reduce a randomness of the operation track caused by the adjustment of the operation speed, the number of key nodes that the path passes through may be used as a weight to adjust the operation speed. The entire AGV operation model may be treated as a system. The more the nodes that the path passes through are, the greater the impact on the entire system when adjusting is. On the contrary, the fewer the nodes that the path passes through are, the smaller the impact on the entire system when adjusting is. When the impact is too great, a stability of the calculation of the system may decrease, which may be not conducive to a convergence of the iteration, so the inverse of the key nodes may be used as the adjustment weight for an assignment correction. Exemplarily, a basically selected operation speed may be 30% of a standard speed of the AGV, and the basic increase data may be 5% of the standard speed of the AGV. When a path passes through 10 nodes, in each calculation, the operation speed may be adjusted to add one-tenth of the basic increase data to improve the stability of the calculation.

In a possible implementation approach, the determination module may be further configured to perform the following steps.

When an adjusted operation speed exceeds a preset value, the operation speed corresponding to all AGVs may be classifies as a new initial value.

The calculation module may be further configured to: when the operation speed corresponding to all AGVs are classified as the new initial value, recalculate the operation track.

When the embodiments of the present disclosure are implemented, the adjusted operation speed may exceed the preset value, which may indicate that the adjusted operation speed exceeds an operation speed limit or a safe speed limit of the AGV trolley. At this time, a new operation plan needs to be found again, so the operation speed of the AGV may be classified as a new initial value and recalculated.

In a possible implementation approach, the service platform includes a service general platform and at least two service sub-platforms, and different service sub-platforms are used to receive different types of data transmitted by the management platform; the service general platform aggregates data collected by all the service sub-platforms and sends the data to the user platform to display to the user.

The sensor network platform uniformly processes received data and then uniformly sends the received data to the management platform.

The management platform includes a plurality of mutually independent management sub-platforms, and the modeling module, the obtaining module, the calculation module, the determination module, and the control module may be configured in a same management sub-platform.

In some embodiments, the determination module may update a plurality of candidate operation speed combinations with a plurality of rounds of iterations to determine the target operation speed combination. At least one of the plurality of rounds of iterations includes: for at least one of the candidate operation speed combinations, updating a corresponding speed change amplitude based on a relationship between the candidate operation speed combination and a historical optimal combination, and updating the candidate operation speed combination based on the speed change amplitude. The historical optimal combination may be determined based on an evaluation algorithm.

Figure 4:
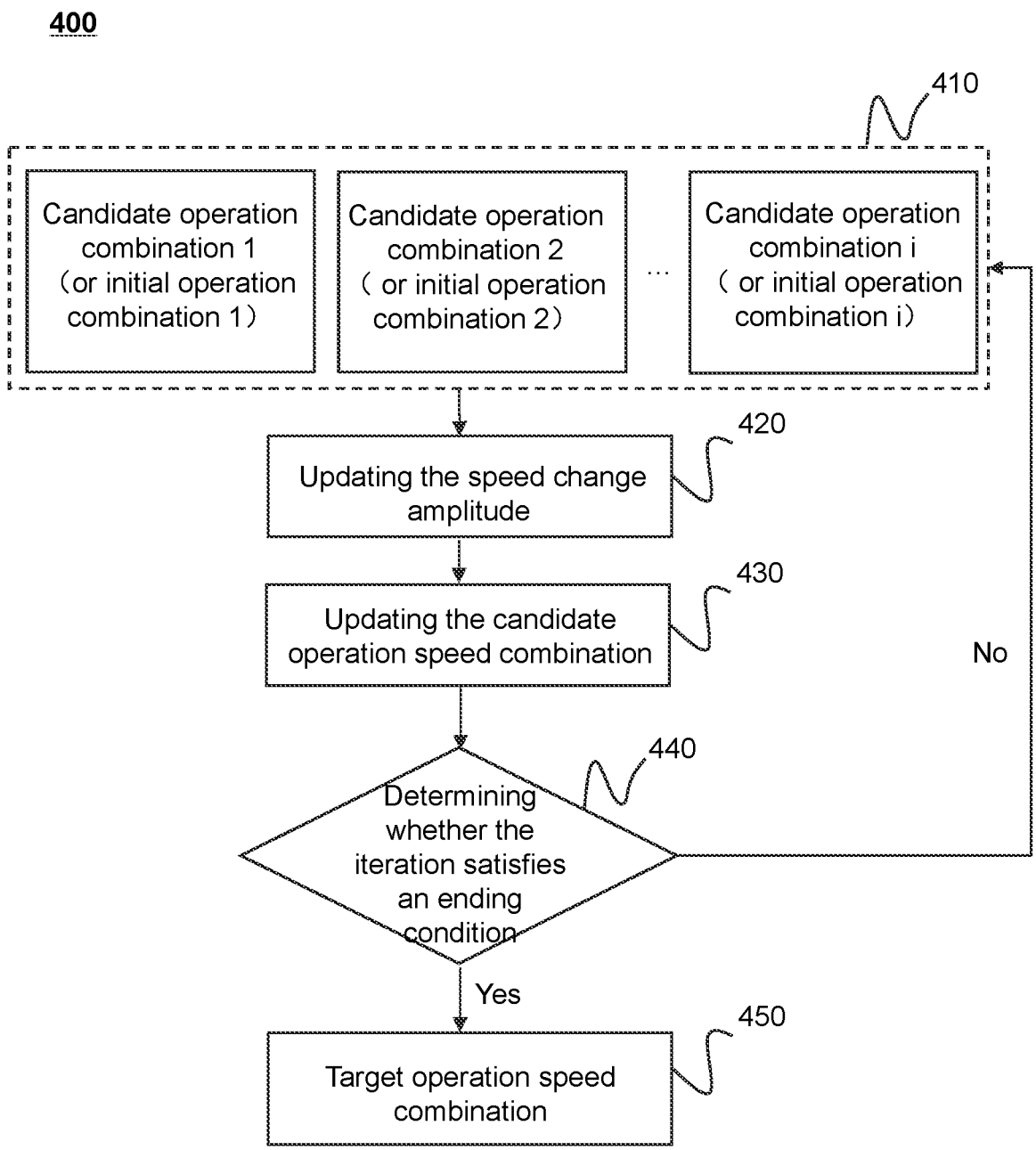
FIG. 4 is a schematic diagram illustrating an exemplary process for iteratively updating candidate operation speed combinations according to some embodiments of the present disclosure.

For more contents on determining the target operation speed combination through iteration, please refer to FIG. 4 and its related descriptions.

In some embodiments, the determination module may be further configured to obtain a sorting result of the candidate operation speed combinations; and update, based on the sorting result, a first acceleration weight and a second acceleration weight.

In some embodiments, the determination module may be further configured to compare, based on the sorting result, a sorted optimal combination in the sorting result with a second optimal combination; and in response to the sorted optimal combination better than the second optimal combination, increase the first acceleration weight and decrease the second acceleration weight in a next round of iteration.

In some embodiments, the determination module may be further configured to compare, based on the sorting result, the sorted optimal combination in the sorting result with at least one third optimal combination. The at least one third optimal combination is at least one optimal combination collectively corresponding to the plurality of candidate operation speed combinations. In response to the sorted optimal combination not better than the at least one third optimal combination, the first acceleration weight may be decreased and the second acceleration weight may be increased in a next round of iteration.

Figure 5:
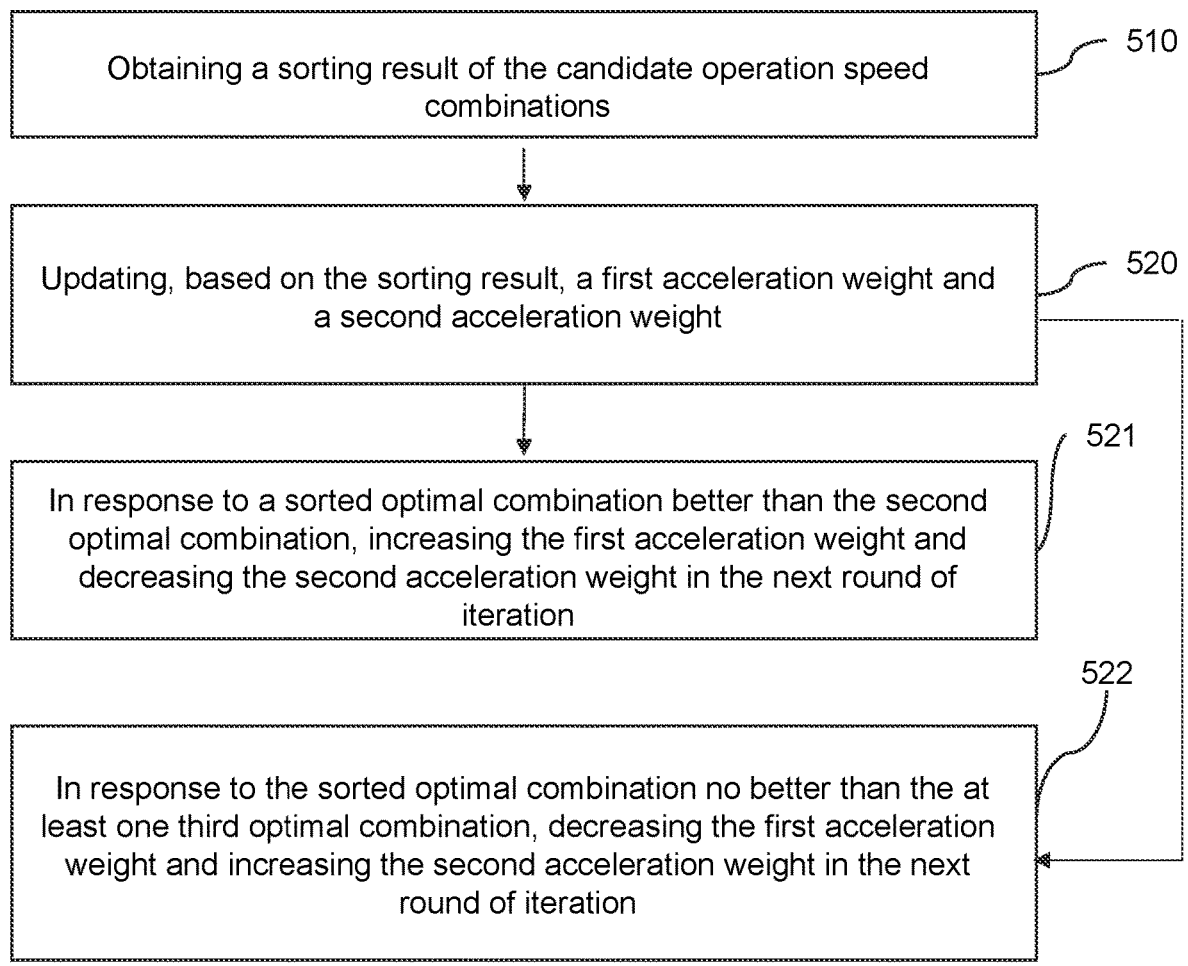
FIG. 5 is a schematic diagram illustrating an exemplary process for updating a first acceleration weight and a second acceleration weight according to some embodiments of the present disclosure.

For more contents on updating the first acceleration weight and the second acceleration weight, please refer to FIG. 5 and related descriptions thereof.

Figure 2:
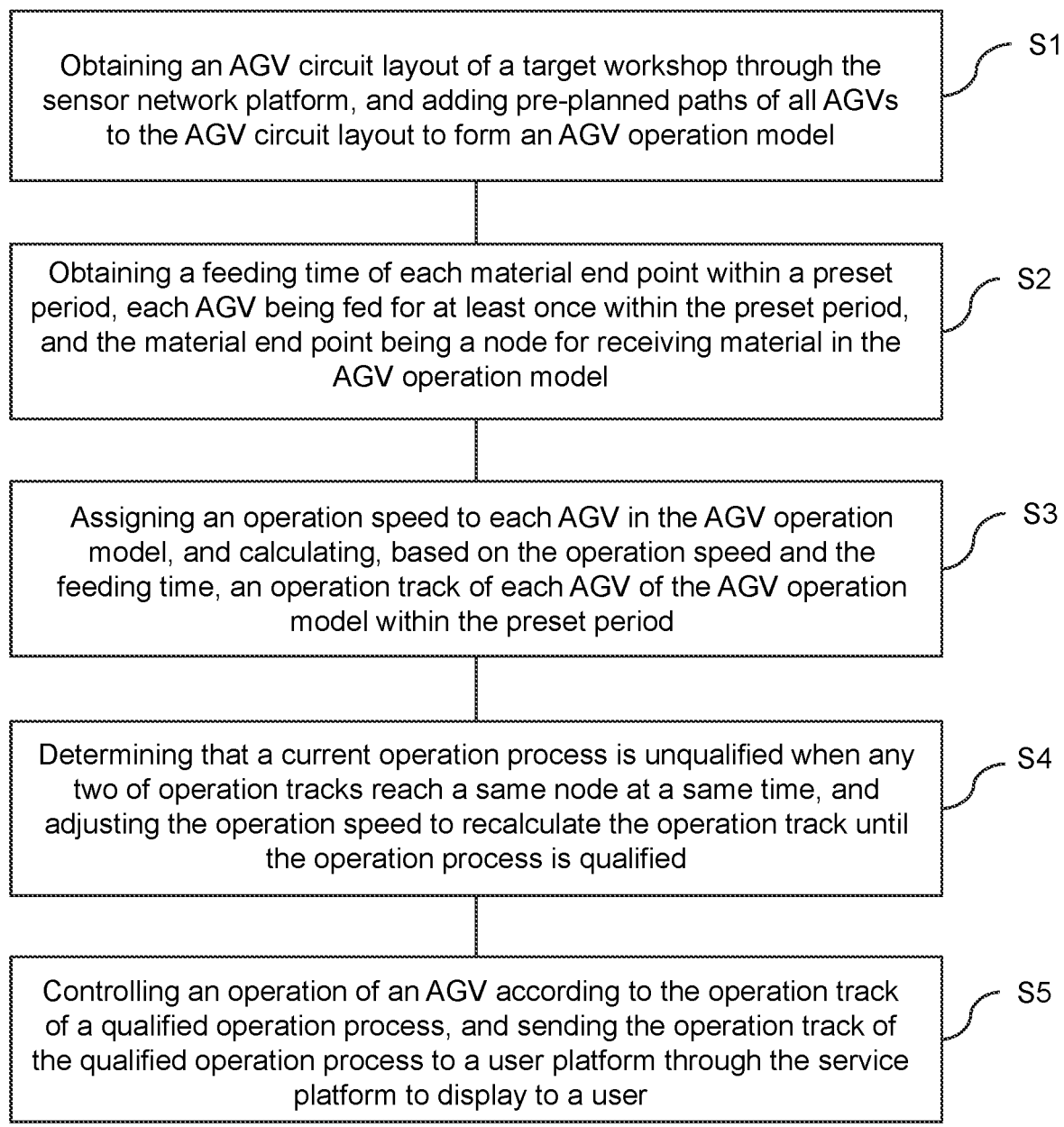
FIG. 2 is a flowchart illustrating an exemplary process of a method of the industrial IoT for the AGV control according to some embodiments of the present disclosure.

On the basis of the above, please refer to FIG. 2, FIG. 2 is a flowchart illustrating an exemplary process of a method of the industrial IoT for the AGV control according to some embodiments of the present disclosure. The method of the industrial IoT for the AGV control may be applied to the system of the industrial IoT for the AGV control in FIG. 1, and further, the method of the industrial IoT may specifically include the following steps S1-S5.

S1: Obtaining an AGV circuit layout of a target workshop through the sensor network platform, and adding pre-planned paths of all AGVs to the AGV circuit layout to form an AGV operation model.

S2: Obtaining a feeding time of each material end point within a preset period, each AGV being fed for at least once within the preset period, and the material end point being a node for receiving material in the AGV operation model.

S3: Assigning an operation speed to each AGV in the AGV operation model, and calculating, based on the operation speed and the feeding time, an operation track of each AGV of the AGV operation model within the preset period.

S4: Determining that a current operation process is unqualified when any two of operation tracks reach a same node at a same time, and adjusting the operation speed to recalculate the operation tracks until the operation process is qualified.

S5: Controlling an operation of an AGV according to the operation track of a qualified operation process, and sending the operation track of the qualified operation process to a user platform through the service platform to display to a user.

In a possible implementation approach, the calculating, based on the operation speed and the feeding time, an operation track of each AGV of the AGV model within the preset period includes: calculating a loading time of each material start point in the AGV operation model within the preset period based on the operation speed and the feeding time, the material start point being a node for providing material in the AGV operation model; and obtaining a path between the material start point and the corresponding material end point in the AGV operation model, and calculate, based on the feeding time, the operation speed and the loading time, a coordinate of the AGV on the path and a corresponding time as the operation track.

In a possible implementation approach, the adjusting the operation speed includes: obtaining a number of key nodes that all the pre-planned paths pass through in the AGV operation model, the key nodes being intersections of AGV lines in the AGV operation model; processing the number of the key nodes as an adjustment weight and assigning the adjustment weight to the path; and when adjusting the operation speed, adjusting the operation speed corresponding to the path according to the adjustment weight.

In a possible implementation approach, the adjustment weight is an inverse of the number of the key nodes; the adjusting the operation speed corresponding to the path according to the adjustment weight includes: when adjusting the operation speed, selecting preset basic increase data of the operation speed; calculating a product of the adjustment weight and the basic increase data as a corrected speed; and superposing the corrected speed to the corresponding operation speed and completing an adjustment of the operation speed.

In a possible implementation approach, the adjusting the operation speed corresponding to the path according to the adjustment weight further includes: when an adjusted operation speed exceeds a preset value, classifying the operation speed corresponding to all the AGVs as a new initial value; and when the operation speed corresponding to all the AGVs are classified as the new initial value, recalculating the operation track.

Figure 3:
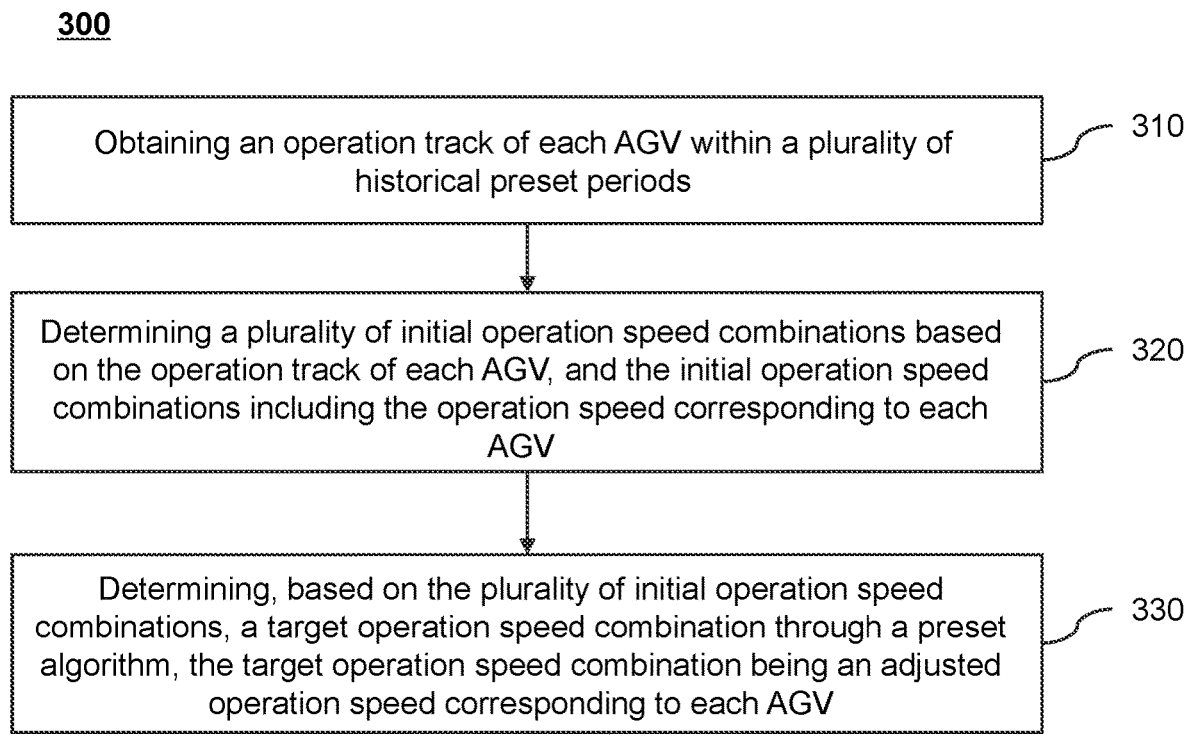
FIG. 3 is a flowchart illustrating an exemplary process for adjusting an operation speed according to some embodiments of the present disclosure.

FIG. 3 is a flowchart illustrating an exemplary process for adjusting an operation speed according to some embodiments of the present disclosure. As shown in FIG. 3, a process 300 includes following steps. In some embodiments, the process 300 may be performed by a determination module.

Step 310, obtaining an operation track of each AGV within a plurality of historical preset periods.

The historical preset period refers to a cycle period in which each AGV is fed for at least once in historical data. For example, the plurality of historical preset periods may be a plurality of preset periods of past 3 days, 7 days, etc. For more contents about the preset period, please refer to the related descriptions of FIG. 1.

Different AGVs in the plurality of historical preset periods may correspond to different operation tracks. Each AGV corresponds to its own operation track. For example, the operation track of a certain AGV may be an operation route of the AGV to transport materials in a certain historical preset period.

In some embodiments, a processor may retrieve the operation track of each AGV within the plurality of historical preset periods in a historical database. The historical database may store the operation track of each AGV within the plurality of historical preset periods. In some embodiments, the processor may call the operation track of each AGV within the plurality of historical preset periods from a storage device. In some embodiments, the processor may obtain the operation track of each AGV within the plurality of historical preset periods by other approaches, for example, the processor may obtain the operation track of each AGV within the plurality of historical preset periods from a management platform.

Step 320, determining a plurality of initial operation speed combinations based on the operation track of each AGV, and the initial operation speed combinations including the operation speed corresponding to each AGV.

The initial operation speed combination refers to a combination of the initial operation speed of each AGV. The initial operation speed combination may be indicated by a vector. For example, the ith initial operation speed combination may be indicated by $X_i=(X_{i1}, X_{i2}, X_{i3}, \ldots, X_{iD})$. Where $X_i$ indicates the operation speed of each AGV, i indicates a number of initial operation speed combinations, D indicates a number of AGVs, D=1, 2, 3 and other positive integers, $X_{i1}, X_{i2}, X_{i3}, \ldots, X_{iD}$ in $X_i$ may respectively indicate the operation speed of each AGV. For example, may indicate the operation speed of transporting an engine by an AGV, $X_{i2}$ may indicate the operation speed of transporting a dashboard by the AGV, $X_{i3}$ may indicate the operation speed of transporting an automobile gearbox by the AGV, etc.

In some embodiments, the processor may determine the number of initial operation speed combinations based on a complexity of material distribution. For example, the number of initial operation speed combinations may be set to be the same as or in multiples of types of materials that need to be distributed by the AGV. Exemplarily, if there are 25 types of materials that need to be distributed by the AGV during an automobile assembly, the number of initial operation speed combinations may be set to be 25. In some embodiments, the number of initial operation speed combinations may be manually set.

In some embodiments, the processor may determine a plurality of initial operation speed combinations based on the operation track of each AGV. In some embodiments, the initial operation speed combination may be generated by a random approach. For example, the processor may randomly generate the plurality of initial operation speed combinations based on the operation track of each AGV within the plurality of historical preset periods. Exemplarily, $X_i = (X^0_{i1}, X^0_{i2}, \ldots, X^0_{iD})$, etc., where 0 is an identifier (indicating a 0th round of iteration, that is, an initial value before the start of the iteration).

Step 330, determining, based on the plurality of initial operation speed combinations, a target operation speed combination through a preset algorithm, and the target operation speed combination being an adjusted operation speed corresponding to each AGV.

The target operation speed combination refers to a finally determined operation speed combination of each AGV to transport the material. The target operation speed combination may be indicated by a vector. For example, the target operation speed combination is indicated by $X=(X_1, X_2, X_3, \ldots, X_D)$, where $X_1, X_2, X_3, \ldots, X_D$ in X respectively indicates the finally determined operation speed of each AGV to transport the material. For example, $X_1$ may indicate the finally determined speed of transporting an engine by an AGV, $X_2$ may indicate the finally determined speed of transporting a dashboard by the AGV, $X_3$ may indicate the finally determined speed of transporting an automobile gearbox by the AGV, etc.

In some embodiments, the processor may determine the target operation speed combination through a variety of preset algorithms. The preset algorithm may be a preset algorithm for determining the target operation speed combination. For example, the preset algorithm may include a regression analysis method, a discriminant analysis method, a random search method, etc.

In some embodiments, the processor may determine the target operation speed combination by iteratively updating a plurality of candidate operation speed combinations. For more contents on the determining the target operation speed combination, please refer to FIG. 4 and its related descriptions thereof.

In some embodiments of the present disclosure, determining, based on the plurality of initial operation speed combinations, the target operation speed combination by the preset algorithm, can save data processing time and ensure the accuracy of the target operation speed combination, which is beneficial to avoid the AGV congestion and realize an intelligent distribution process of various materials.

FIG. 4 is a schematic diagram illustrating an exemplary process for iteratively updating candidate operation speed combinations according to some embodiments of the present disclosure. As shown in FIG. 4, the process for iteratively updating the candidate operation speed combinations may be performed by a determination module.

In some embodiments, a processor may update a plurality of candidate operation speed combinations with a plurality of rounds of iterations to determine the target operation speed combination. During the first round of iteration, the plurality of candidate operation speed combinations may include the plurality of initial operation speed combinations. At least one of the plurality of rounds of iterations includes: for at least one of the candidate operation speed combinations, updating a corresponding speed change amplitude based on a relationship between the candidate operation speed combination and a historical optimal combination, and updating the candidate operation speed combination based on the speed change amplitude. The historical optimal combination may be determined based on an evaluation algorithm.

The candidate operation speed combination refers to a combination used for iterative update to determine the target operation speed combination. The candidate operation speed combination 410 may be indicated by a vector. For example, the ith candidate operation speed combination may be indicated by $X^k_i = (X^k_{i1}, X^k_{i2}, X^k_{i3}, \ldots, X^k_{iD})$, where the value of k indicates a number of rounds of iterations. The approach of indication of the candidate operation speed combination may be similar to the approach of indication of the initial operation speed combination. For more details, please refer to the relevant descriptions of the initial operation speed combination.

In some embodiments, during the first round of iteration, the plurality of candidate operation speed combinations may include the plurality of initial operation speed combinations. As shown in FIG. 4, the plurality of initial operation speed combinations may include an initial operation speed combination 1, an initial operation speed combination 2, an initial operation speed combination i, etc.

In some embodiments, the at least one of the plurality of rounds of iterations includes: for at least one of the candidate operation speed combinations, updating a corresponding speed change amplitude based on a relationship between the candidate operation speed combination and a historical optimal combination, and updating the candidate operation speed combination based on the speed change amplitude. For a detailed description of the historical optimal combination, please refer to the related contents below. As shown in FIG. 4, the iterative update of the candidate operation speed combinations may be performed based on the following steps.

Step 420, updating the speed change amplitude.

The speed change amplitude refers to a change amplitude of the operation speed of the AGV. In some embodiments, the speed change amplitude may include a plurality of groups. For example, a number of speed change amplitudes may be the same as the number of the candidate operation speed combinations. Each of the plurality of groups of speed change amplitudes and each of the candidate operation combinations may be in a one-to-one correspondence.

In some embodiments, each group of speed change amplitude may include a plurality of sub-change amplitudes, and each sub-change amplitude may represent an updating amplitude of the operation speed of each AGV in the candidate operation speed combination corresponding to the speed change amplitude. For example, the speed change amplitude corresponding to an ith candidate operation speed combination may be indicated as $V_i = (V_{i1}, V_{i2}, V_{i3}, \ldots, V_{iD})$, where $V_{i1}, V_{i2}, V_{i3}, \ldots V_{iD}$, etc., may be the sub-change amplitudes, which respectively indicates the change amplitude of the operation speed of each AGV. For example, $V_{i1}$ may indicate a speed change amplitude of $X_{i1}$, $V_{i2}$ may indicate a speed change amplitude of $X_{i2}$, $V_{i3}$ may indicate a speed change amplitude of $X_{i3}$, etc.

In some embodiments, the speed change amplitude may be related to a first acceleration weight and a second acceleration weight. The first acceleration weight may be a weight of the first optimal combination, and the second acceleration weight may be a weight of the second optimal combination.

The first acceleration weight may refer to a weight corresponding to the first optimal combination when the speed change amplitude is determined. The greater the first acceleration weight is, the greater the influence of the first optimal combination on the speed change amplitude is. For detailed descriptions of the first optimal combination, please refer to the related contents below.

The second acceleration weight may refer to a weight corresponding to the second optimal combination when the speed change amplitude is determined. The greater the second acceleration weight is, the greater the influence of the second optimal combination on the speed change amplitude is. For detailed descriptions of the second optimal combination, please refer to the related contents below.

In some embodiments, the processor may obtain a sorting result of the candidate operation speed combinations, and update, based on the sorting result, the first acceleration weight and the second acceleration weight. For more contents about updating the first acceleration weight and the second acceleration weight based on the sorting result, please refer to FIG. 5 and the related descriptions thereof.

The processor may update the speed change amplitude based on the first acceleration weight and the second acceleration weight, so that the speed change amplitude can be more accurate, thereby ensuring that the updated candidate operation speed combination is more accurate.

The historical optimal combination refers to a candidate operation speed combination with the highest sorting result in the historical iteration process. For detailed descriptions of the sorting result, please refer to the related contents of FIG. 5.

In some embodiments, the historical optimal combination may include the first optimal combination corresponding to the candidate operation speed combination, and the second optimal combination collectively corresponding to the plurality of the candidate operation speed combinations.

The first optimal combination refers to a candidate operation speed combination corresponding to the candidate operation speed combination with the highest sorting result in the iteration process up to the current round of iteration of each candidate operation speed combination. For example, the first optimal combination of a candidate operation speed combination i may be indicated in the form of a vector as $(X^{20}_{i1}, X^{20}_{i2}, \ldots, X^{20}_{iD})$. This vector may indicate that in the iteration process up to the current round of iteration, the sorting result of the plurality of candidate operation speeds corresponding to the candidate operation speed combination i in the 20th round of iteration is the highest.

The second optimal combination refers to a candidate operation speed combination corresponding to the candidate operation speed combination with the highest sorting result in the iteration process up to the current round of iteration of all the candidate operation speed combinations. For example, the second optimal combination may be indicated in the form of a vector as $(X^{20}_{31}, X^{20}_{32}, \ldots, X^{20}_{3D})$, which indicates that in the iteration process up to the current round of iteration, the sorting result of the plurality of candidate operation speeds corresponding to the candidate operation speed combination 3 in the 20th round of iteration of all the candidate operation combination speed combinations is the highest.

The processor may iteratively update the candidate operation speed combinations based on a collective influence of the first optimal combination and the second optimal combination, so that the target operation speed combination can be determined more quickly, the number of rounds of iterations can be reduced, and the iteration efficiency can be improved.

In some embodiments, the historical optimal combination may be determined based on the evaluation algorithm.

In some embodiments, the evaluation algorithm may refer to an algorithm for evaluating the candidate operation speed combinations based on a machine learning model, a preset rule, etc.

In some embodiments, the evaluation algorithm may include predicting, based on the candidate operation speed combination, the arrival time of each AGV arriving at the node through a prediction model; and determining, based on the arrival time and a material demand urgency, a sorting result of the candidate operation speed combinations. For more contents on the evaluation algorithm, please refer to FIG. 7 and the related descriptions thereof.

In some embodiments, the processor may update the corresponding speed change amplitude based on the relationship between the at least one candidate operation speed combination and the historical optimal combination. The relationship between the candidate operation speed combination and the historical optimal combination may be indicated by a difference value, etc. The processor may obtain, based on a difference between the candidate operation speed combination and the first optimal combination, a difference between the candidate operation speed combination and the second optimal combination, and a speed change amplitude to be processed, an updated speed change amplitude.

In the first round of iteration, the processor may update the candidate operation speed combination based on the initial speed change amplitude, and determine the initial speed change amplitude as the speed change amplitude to be processed in a next round of iteration. The initial speed change amplitude may be a system default value, an experience value, a manually preset value, or the like, or any combination thereof.

In each round of subsequent iterations, the speed change amplitude to be processed may be updated to obtain an updated speed change amplitude, and the updated speed change amplitude may be determined as the speed change amplitude to be processed in the next round of iteration.

In some embodiments, the updated speed change amplitude may be determined by the following formula: the updated speed change amplitude of the (k+1) th round of iteration=an inertia weight*the speed change amplitude to be processed of the kth round of iteration+the first acceleration weight*a first difference value+the second acceleration weight*a second difference value. Where the first difference value corresponds to the difference between the candidate operation speed combination and the first optimal combination, and the second difference value corresponds to the difference between the candidate operation speed combination and the second optimal combination. The inertia weight, the first acceleration weight, and the second acceleration weight may be preset or determined in other ways. For example, the processor may randomly generate any value in the interval [0,1] as the weight value. Exemplarily, during the kth round of iteration, the inertia weight is 0.3, and the speed change amplitude to be processed of the kth round of iteration is (+0.1 m/s, +0.1 m/s, . . . , +0.2 m/s); the first acceleration weight is 0.2, and the first difference value is (+1 m/s, +2 m/s, . . . , −0.5 m/s); the second acceleration weight is 0.5, and the second difference value is (−0.2 m/s, −0.2 m/s, . . . , −1 m/s). According to the above formula, the updated speed change amplitude after the (k+1)th round of iteration is (+0.13 m/s, +0.33 m/s, . . . , −0.54 m/s).

In some embodiments, the first acceleration weight and the second acceleration weight may be adjusted based on the sorting result. For more contents about the first acceleration weight, the second acceleration weight and the sorting result, please refer to FIG. 5 and related descriptions thereof.

Step 430, updating the candidate operation speed combination.

In some embodiments, the updating the candidate operation speed combination based on the speed change amplitude may include following steps.

In the first round of iteration, the initial operation speed combination may be used as the candidate operation speed combination, and the initial operation speed combination may be updated based on the initial speed change amplitude. The initial speed change amplitude may be a non-updated speed change amplitude, which may be preset based on a historical experience.

In some embodiments, when iteratively updating the candidate operation speed combinations, the operation speed of each AGV may be iteratively updated based on a speed change amplitude corresponding to the operation speed of each AGV in the operation speed combination, thereby updating the candidate operation speed combination. In the kth (k>1) round of update, the processor may update the candidate operation speed combination obtained in the (k−1)th round of update based on the speed change amplitude of the kth round of update, so as to obtain the candidate operation speed combination of the kth round. For example, the speed change amplitude of the kth round of update may be added to the $X_{i1}$ of the (k−1)th round of iteration, the speed change amplitude $V_{i2}$ of the kth round of update may be added to the $X_{i2}$ of the (k−1)th round of iteration, and the speed change amplitude $V_{i3}$ of the kth round of update may be added to the $X_{i3}$ of the (k−1)th round of iteration, etc., to obtain the candidate operation speed combination of the kth round of iteration.

In 440, determining whether the iteration satisfies an ending condition.

In some embodiments, during iterating the candidate operation speed combination, when the iteration meets a preset condition for ending the iteration, the iteration ends. The preset condition may be that the number of rounds of iterations reaches an iteration number threshold. For example, the number threshold of rounds of iterations may be set to be 100, then the iteration may end when the number of rounds of iterations reaches 100. When the number of rounds of iterations reaches the number threshold of rounds of iterations, if the candidate operation speed is unqualified, relevant parameters such as the initial operation speed combination, the weight, and the number threshold of rounds of iterations, etc. may be modified, and the iteration may be performed again. The candidate operation speed being qualified means that the operation tracks obtained by using the candidate operation speed combination may not reach the same node at the same time. In some embodiments, it may be determined whether the candidate operation speed is qualified, in response to the determination that the candidate operation speed is qualified, the iteration may end.

In some embodiments, after each round of iterative update is completed, it may be determined whether the at least one of the plurality of groups of candidate operation combinations satisfies the ending condition of the iteration. In response to the determination that the iteration satisfies the ending condition of the iteration, the iteration may end, and the historical optimal combination may be determined as a target operation speed combination 450. In response to the determination that the iteration does not satisfy the ending condition of the iteration, the next round of iteration may be performed until the ending condition of the iteration is satisfied.

In some embodiments of the present disclosure, a plurality of candidate operation speed combinations may be updated in an iterative approach. Compared with the candidate operation speed combinations without the iterative updates, the updated candidate operation speed combinations can be continuously optimized to further ensure that each AGV is operated smoothly.

FIG. 5 is a schematic diagram illustrating an exemplary process for updating a first acceleration weight and a second acceleration weight according to some embodiments of the present disclosure. As shown in FIG. 5, process 500 may include the following steps. In some embodiments, process 500 may be performed by a determination module.

Step 510, obtaining a sorting result of the candidate operation speed combinations.

The sorting result refers to a sorting result of a plurality of candidate operation speed combinations based on an arrival time of an AGV at a node with a higher material demand urgency as a standard. For example, if an engine is urgently needed at a material end point, a processor may sort the plurality of candidate operation speeds based on the arrival time of the AGV transporting the engine at the material end corresponding to the engine as a standard. The earlier the arrival time is, the higher the sorting of the candidate operation speed combination is. For example, the arrival time of the AGV transporting the engine at the material end point corresponding to the engine corresponding to the candidate operation speed combination $X_1$ is earlier than the arrival time corresponding to $X_2$, and the arrival time corresponding to the candidate operation speed combination $X_2$ is earlier than the arrival time corresponding to the candidate operation speed combination $X_3$, then the sorting result of the candidate operation speed combinations is $X_1$, $X_2$, and $X_3$ in order from high to low. For more contents on the arrival time and the material demand urgency, please refer to FIG. 7 and the related descriptions thereof.

In some embodiments, the processor may predict the arrival time of each AGV arriving at the node (e.g., the arrival time of each AGV arriving at the material end point) through the prediction model based on the candidate operation speed combination. The processor may determine the sorting result of the plurality of candidate operation speed combinations based on the arrival time of arriving at the material end point and the material demand urgency. For more contents on obtaining the sorting result, please refer to FIG. 7 and the related descriptions thereof.

Step 520, updating, based on the sorting result, a first acceleration weight and a second acceleration weight.

In some embodiments, the processor may update the first acceleration weight and the second acceleration weight based on the sorting result.

Step 521, in response to a sorted optimal combination better than the second optimal combination, increasing the first acceleration weight and decreasing the second acceleration weight in the next round of iteration.

In some embodiments, the processor may compare the sorted optimal combination in the sorting result with the second optimal combination based on the sorting result. The processor may increase the first acceleration weight and decrease the second acceleration weight in the next round of iteration in response to the sorted optimal combination better than the second optimal combination.

The sorted optimal combination refers to a combination with the highest ranking in the sorting result among the plurality of updated candidate operation speed combinations in the current round of iteration after the current round of iteration. For example, after the current round of iteration (such as the Pth round of iteration), the sorting result of the plurality of updated candidate operation speed combinations in the Pth round of iteration is $X^P_1, X^P_2, X^P_3, \ldots$ etc. $X^P_1$ is the sorted optimal combination among the plurality of candidate operation speed combinations in the Pth round of iteration.

In some embodiments, the processor may update the first acceleration weight and the second acceleration weight by comparing the sorted optimal combination with the second optimal combination. For example, in the sorting result, the sorted optimal combination $X^P_1$ of the Pth round of iteration is compared with the second optimal combinations from the first round of iteration to the (P−1)th round of iteration, and the ranking of the sorted optimal combination $X^P_1$ is higher than the ranking of the second optimal combination, then the first acceleration weight may be increased and the second acceleration weight may be decreased in the next round of iteration (the (P+1)th round of iteration).

By comparing the sorted optimal combination with the second optimal combination, an update approach of the first acceleration weight and the second acceleration weight may be quickly determined. The case that the sorted optimal combination is better than the second optimal combination may show that the current round of iteration makes the candidate operation speed combination better than the previous rounds of iterations. Therefore, an updating strategy may be proposed to increase the first acceleration weight and decrease the second acceleration weight. The strategy can make the direction of weight adjustment more targeted, which is conducive to speeding up the iterative updating process.

Step 522, in response to the sorted optimal combination no better than the at least one third optimal combination, decreasing the first acceleration weight and increasing the second acceleration weight in the next round of iteration.

In some embodiments, the processor may compare the sorted optimal combination in the sorting result with at least one third optimal combination based on the sorting result. In response to the sorted optimal combination no better than the at least one third optimal combination, the processor may decrease the first acceleration weight and increase the second acceleration weight in the next round of iteration.

The at least one third optimal combination may be candidate operation speed combinations corresponding to several top sorting results among all candidate operation speed combinations in the iteration process up to the current round of iteration. For example, the at least one third optimal combination may be the candidate operation speed combination of the top 5 sorting results in the iteration process up to the current round of iteration.

In some embodiments, the processor may update the first acceleration weight and the second acceleration weight by comparing the sorted optimal combination with the at least one third optimal combination. For example, in a sorting result, the sorted optimal combination $X^P_1$ of the Pth round of iteration may be compared with the at least one third optimal combination from the first round of iteration to the (P−1)th round of iteration, and the ranking of the sorted optimal combination $X^P_1$ may be no higher than that of the at least one third optimal combination, then in the next round of iteration (the (P+1)th round of iteration), the first acceleration weight may be decreased and the second acceleration weight may be increased.

By selecting the at least one third optimal combination and comparing the at least one third optimal combination with the sorted optimal combination, an accuracy of updating the weight can be guaranteed. The case that the sorted optimal combination is no better than the at least one third optimal combination may show that the previous rounds of iterations make the candidate operation speed combination better than the current round of iteration. Therefore, an updating strategy may be proposed to decrease the first acceleration weight and increase the second acceleration weight. The strategy may make the direction of weight adjustment more targeted, which is conducive to speeding up the updating process.

Adjusting the first acceleration weight and the second acceleration weight according to the sorted result may achieve a purpose of preferentially transporting materials in urgent demand, effectively speed up the operation of the AGV, and improve the efficiency of transporting materials of the AGV.

Figure 6:
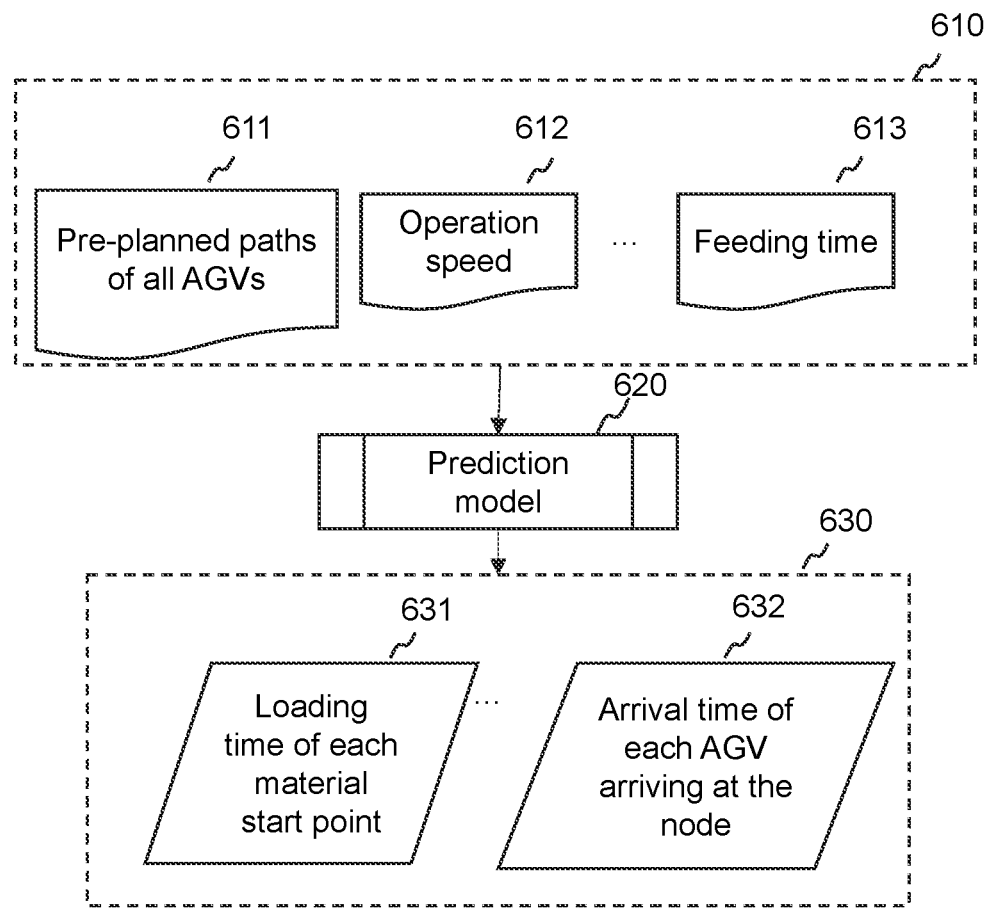
FIG. 6 is a schematic diagram illustrating an exemplary prediction model according to some embodiments of the present disclosure.

FIG. 6 is a schematic diagram illustrating an exemplary prediction model according to some embodiments of the present disclosure.

In some embodiments, the processor may predict, based on pre-planned paths of all the AGVs, an operation speed and a feeding time, a loading time of each material start point and an arrival time of each AGV at a node in an AGV operation model within the preset period through a prediction model.

The loading time 631 of each material start point may refer to a time within the preset period when the material start point provides materials. For example, the loading time of a certain material start point may be 12:00. The loading times corresponding to different material start points may be the same or different.

The arrival time 632 of each AGV arriving at the node may refer to the time when each AGV operates to a certain node within a preset period. The arrival time of each AGV arriving at the node may include a time when each AGV arrives at the node that receives the material (the material end point), the time when each AGV arrives at the node that provides the material (the material start point), the time when each AGV arrives at the intersection of the AGV circuit, etc. For example, the arrival time of an AGV arriving at the node that receives the material may be 13:00.

The prediction model 620 may be a machine learning model. In some embodiments, the type of the prediction model may include a neural network model, a deep neural network model, etc., and the selection of the model type may depend on specific circumstances.

In some embodiments, an input 610 of the prediction model may include pre-planned paths 611 of all AGVs, an operation speed 612, a feeding time 613, etc. The operation speed may include the operation speed of each AGV, etc. The feeding time may include the feeding times of all nodes receiving materials, etc. For the pre-planned paths of all AGVs, operation speed and feeding time, please refer to the relevant descriptions in FIG. 1.

In some embodiments, an output 630 of the prediction model may include a loading time 631 of each material start point and an arrival time 632 of each AGV arriving at the node in the AGV operation model within the preset period.

In some embodiments, the processor may predict an operation track of each AGV based on the output of the prediction model. For example, the processor may determine a plurality of nodes that each AGV arrives at and the arrival times of arriving at the plurality of nodes as the predicted operation track of each AGV.

In some embodiments, the processor may train the prediction model based on a large number of a plurality of groups of training samples with labels. Each group of training samples may include sample pre-planned paths of all AGVs, sample operation speed, and sample feeding time. The label of each group of training samples may be the sample loading time of each material start point and the sample arrival time of each AGV arriving at the node within the preset period corresponding to the group of training samples. In some embodiments, the plurality of training samples and labels may be derived from historical data. Exemplarily, the sample pre-planned paths of all AGVs, the sample operation speed and the sample feeding time may be derived from historical AGV operation data. In some embodiments, the label of each group of training samples may be derived from the historical data, for example, the label of each group of training samples may be derived from historical operation records corresponding to each group of training samples, etc.

In some embodiments of the present disclosure, the prediction model may be used to predict the loading time of each material start point and the arrival time of each AGV arriving at the node, and then determine the operation track of each AGV, which can ensure an accuracy of the determined operation track, and then better implement an intelligent distribution process of various materials.

FIG. 7 is a flowchart illustrating an exemplary process for determining a sorting result of the candidate operation speed combinations according to some embodiments of the present disclosure. As shown in FIG. 7, process 700 may include the following steps.

Step 710, predicting, based on the candidate operation speed combination, the arrival time of each AGV arriving at the node through a prediction model.

In some embodiments, the processor may obtain different operation speeds corresponding to each AGV in the one or more candidate operation speed combinations. The processor may input the different operation speeds corresponding to each AGV, pre-planned paths of all AGVs, and a feeding time into the prediction model. The prediction model may output arrival times of each AGV arriving at different nodes corresponding to the different operation speeds, for example, the arrival times of each AGV arriving at different material ends corresponding to the different operation speeds. For more contents of the prediction model, please refer to the related descriptions of FIG. 6.

Step 720, determining, based on the arrival time and a material demand urgency, a sorting result of the candidate operation speed combinations.

In some embodiments, the material demand urgency refers to a priority of the material demand of the material end point. The processor may determine the material demand urgency of different material end points based on the feeding times at the material end points. The earlier the feeding time at the material end point is, the higher the material demand urgency corresponding to the material end point is. The processor may determine, based on the feeding times at the material end points, the material end points with the highest, the second highest, and the third highest material demand urgency.

In some embodiments, the processor may determine the sorting result of the plurality of candidate operation speed combinations based on the material demand urgency. For example, the processor may sequentially sort the plurality of candidate operation speed combinations in an order of the arrival times corresponding to the material end point with the highest material demand urgency. The order of the arrival times may refer to the order in which different AGVs arrive at the material end point from early to late. For example, the time when different AGVs reach the material end point may be: 8:13, 8:10, 8:12, etc. The order of the arrival times may be 8:10, 8:12, 8:13, etc. The earlier the arrival time corresponding to the material end point with the highest material demand urgency is, the higher the sorting of the corresponding candidate operation speed combination is. When the arrival time corresponding to the material end point with the highest material demand urgency of some candidate operation speed combinations are the same, the processor may sort the candidate operation speed combinations in an order of the arrival time corresponding to the material end point with the second highest material demand urgency. If some of the candidate operation speed combinations also include the same arrival time corresponding to the material end point with the second highest material demand urgency, the processor may sort the candidate operation speed combinations in an order of the arrival time corresponding to the material end point with the third highest material demand urgency, etc. The processor may obtain a sorting result of the plurality of candidate speed combinations. For more contents about the sorting result, please refer to the related descriptions of FIG. 5.

In some embodiments of the present disclosure, through determining the sorting result of the plurality of candidate speed combinations based on the arrival time and the material demand urgency, the most urgently demanding material may be transported to the material end point first, so that an assembly speed can be improved, and a transportation efficiency can be improved.

In some embodiments, a non-transitory computer-readable storage medium storing computer instructions may be provided, when the computer reads the computer instructions in the storage medium, a computer implements the system of industrial IoT and the method for the AGV control.

Those skilled in the art may realize that the units and algorithm operations of each example described in combination with the embodiments disclosed herein may be implemented on electronic hardware, computer software, or a combination of the two. To clearly explain an interchangeability of the hardware and the software, the above description has generally described the components and operations of each example in terms of function. Whether these functions are performed in hardware or software depends on the specific application and design constraints of the technical solution. Skilled artisans may implement the described functionality using different methods for each particular application, but such implementations should not be considered beyond the scope of this description.

In the several embodiments provided in this the present disclosure, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features can be ignored, or not implemented. In addition, the shown or discussed mutual coupling or direct coupling or communication connection may be indirect coupling or communication connection through some interfaces, devices, or units, and may also be electrical, mechanical, or other forms of connection.

The unit described as a separate component may or may not be physically separated. As a unit, it is obvious that those of ordinary skill in the art can realize that the unit and algorithm steps of each example described in conjunction with the embodiments disclosed herein can be used. It is implemented by electronic hardware, computer software or a combination of the two. In order to clearly illustrate the interchangeability of hardware and software, the above description has generally described the components and steps of each example in terms of functions. Whether these functions are performed in hardware or software depends on the specific application and design constraints of the technical solution. Those skilled in the art may implement the described functions using different approaches for each particular application, but such implementations should not be considered beyond the scope of the present disclosure.

In addition, each functional unit in each embodiment of the present disclosure may be integrated into one processing unit, or each unit may exist physically independently, or two or more units may be integrated into one unit. The above-mentioned integrated units may be implemented in the form of hardware, or may be implemented in the form of software functional units.

If the integrated unit are implemented in the form of a software functional unit and sold or used as an independent product, the unit may be stored in a computer-readable storage medium. Based on this understanding, the essential technical solutions of the present disclosure, or parts that contribute to the existing technology or all or part of the technical solutions may be embodied in the form of software products, and the computer software products may be stored in a storage medium, including some instructions used to make a computer device (a personal computer, a server, or a grid device, etc.) execute a part or all operations of the method according to the embodiments of the present disclosure. The aforementioned storage medium includes: a U disk, a removable hard disk, a read-only memory (ROM), a random-access memory (RAM), a magnetic disk or an optical disk and other media that can store program codes.

The specific embodiments described above further describe the purpose, technical solutions, and beneficial effects of the present disclosure in detail. It should be understood that the above descriptions are only specific implementations of the present disclosure, and are not intended to limit the scope of the present disclosure. Any modification, equivalent replacement, improvement, etc. made within the spirit and principle of the present disclosure shall be included in the protection scope of the present disclosure.

What is claimed is:

1. A system of an industrial Internet of Things (IoT) for an automated guided vehicle (AGV) control, comprising a service platform, a management platform and a sensor network platform connected in sequence, wherein the management platform includes:
    a modeling module configured to obtain an AGV circuit layout of a target workshop through the sensor network platform, and add pre-planned paths of all AGVs to the AGV circuit layout to form an AGV operation model;
    an obtaining module configured to obtain a feeding time of each material end point within a preset period, each AGV of the all AGVs in the AGV operation model being fed for at least once within the preset period, and the material end point being a node for receiving material in the AGV operation model;
    a calculation module configured to assign an operation speed to the each AGV of the all AGVs in the AGV operation model, and calculate, based on the operation speed and the feeding time, an operation track of the each AGV of the all AGVs in the AGV operation model within the preset period;
    a determination module configured to determine that a current operation process is unqualified when any two of operation tracks reach a same node at a same time, and adjust the operation speed to recalculate the operation tracks until the operation process is qualified; and
    a control module configured to control an operation of the each AGV of the all AGVs in the AGV operation model according to the operation track of the each AGV of a qualified operation process, and send the operation track of the each AGV of the qualified operation process to a user platform through the service platform to display to a user;
    the determination module is further configured to:
        obtain a number of key nodes that the pre-planned paths of the all AGVs pass through in the AGV operation model, wherein the key nodes are intersections of AGV circuits in the AGV operation model;
        process the number of the key nodes as an adjustment weight and assign the adjustment weight to each of the pre-planned paths of the all AGVs; and
        when adjusting the operation speed, adjust the operation speed corresponding to the each of the pre-planned paths of the all AGVs according to the adjustment weight.

2. The system of the industrial IoT of claim 1, wherein the calculation module is further configured to:
    calculate a loading time of each material start point in the AGV operation model within the preset period based on the operation speed and the feeding time, wherein the material start point is a node for providing material in the AGV operation model; and
    obtain a path between the material start point and a corresponding material end point in the AGV operation model, and calculate, based on the feeding time, the operation speed, and the loading time, a coordinate of an AGV on the path and a corresponding time as the operation track of the AGV, wherein the AGV is one of the all AGVs in the AGV operation model.

3. The system of the industrial IoT of claim 1, wherein the adjustment weight is an inverse of the number of the key nodes;
    the determination module is further configured to:
        when adjusting the operation speed, select preset basic increase data of the operation speed;
        calculate a product of the adjustment weight and the basic increase data as a corrected speed; and
        superpose the corrected speed to the operation speed correspondingly to complete an adjustment of the operation speed.

4. The system of the industrial IoT of claim 3, wherein the determination module is further configured to:

when an adjusted operation speed exceeds a preset value, classify operation speeds corresponding to the all AGVs in the AGV operation model as a new initial value; and the calculation module is further configured to:

when the operation speeds corresponding to the all AGVs in the AGV operation model are classified as the new initial value, recalculate the operation tracks.

5. The system of the industrial IoT of claim 1, wherein the service platform includes a service general platform and at least two service sub-platforms, and the at least two service sub-platforms are used to receive different types of data transmitted by the management platform;

the service general platform aggregates data collected by the at least two service sub-platforms and sends the data to the user platform to display to the user;

the sensor network platform uniformly processes received data and then uniformly sends the received data to the management platform; and the management platform includes a plurality of mutually independent management sub-platforms, wherein the modeling module, the obtaining module, the calculation module, the determination module and the control module are configured in a same management sub-platform.

6. A method of an industrial Internet of Things (IoT) for an automated guided vehicle (AGV) control, the method is applied to a service platform, a management platform, and a sensor network platform connected in sequence, wherein the method is executed by the management platform;

the method comprising:

obtaining an AGV circuit layout of a target workshop through the sensor network platform, and adding pre-planned paths of all AGVs to the AGV circuit layout to form an AGV operation model;

obtaining a feeding time of each material end point within a preset period, each AGV of the all AGVs in the AGV operation model being fed for at least once within the preset period, and the material end point being a node for receiving material in the AGV operation model;

assigning an operation speed to the each AGV of the all AGVs in the AGV operation model, and calculating, based on the operation speed and the feeding time, an operation track of the each AGV of the all AGVs in the AGV operation model within the preset period;

determining that a current operation process is unqualified when any two of operation tracks reach a same node at a same time, and adjusting the operation speed to recalculate the operation track until the operation process is qualified; and controlling an operation of the each AGV of the all AGVs in the AGV operation model according to the operation track of the each AGV of a qualified operation process, and sending the operation track of the each AGV of the qualified operation process to a user platform through the service platform to display to a user;

the adjusting the operation speed comprising:

obtaining a number of key nodes that the pre-planned paths of the all AGVs pass through in the AGV operation model, wherein the key nodes are intersections of AGV lines in the AGV operation model;

processing the number of the key nodes as an adjustment weight and assigning the adjustment weight to each of the pre-planned paths of the all AGVs; and when adjusting the operation speed, adjusting the operation speed corresponding to the each of the pre-planned paths of the all AGVs according to the adjustment weight.

7. The method of the industrial IoT of claim 6, wherein the calculating, based on the operation speed and the feeding time, an operation track of the each AGV of the all AGVs in the AGV model within the preset period includes:

calculating a loading time of each material start point in the AGV operation model within the preset period based on the operation speed and the feeding time, wherein the material start point is a node for providing material in the AGV operation model; and obtaining a path between the material start point and a corresponding material end point in the AGV operation model, and calculate, based on the feeding time, the operation speed and the loading time, a coordinate of an AGV on the path and a corresponding time as the operation track of the AGV, wherein the AGV is one of the all AGVs in the AGV operation model.

8. The method of the industrial IoT of claim 7, wherein the adjustment weight is an inverse of the number of the key nodes;

the adjusting the operation speed corresponding to the path according to the adjustment weight including:

when adjusting the operation speed, selecting preset basic increase data of the operation speed;

calculating a product of the adjustment weight and the basic increase data as a corrected speed; and superposing the corrected speed to the operation speed correspondingly and completing an adjustment of the operation speed.

* * * * *